(12) United States Patent  (10) Patent No.: US 8,188,684 B2
Watanabe  (45) Date of Patent: May 29, 2012

(54) PORTABLE DEVICE, RECORDING MEDIUM STORING LIGHT EMISSION CONTROL PROGRAM AND LIGHT EMISSION CONTROL METHOD THEREOF

(75) Inventor: Yasuhiko Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 12/689,546

(22) Filed: Jan. 19, 2010

(65) Prior Publication Data

US 2010/0117535 A1    May 13, 2010

Related U.S. Application Data

(63) Continuation of application No. PCT/JP2007/065461, filed on Aug. 7, 2007.

(51) Int. Cl.
*H05B 39/04* (2006.01)
(52) U.S. Cl. .............. 315/308; 702/208; 702/213
(58) Field of Classification Search .............. 315/308
See application file for complete search history.

(56) References Cited

U.S. PATENT DOCUMENTS

2010/0139575 A1* 6/2010 Duncan et al. ............... 119/712

FOREIGN PATENT DOCUMENTS

| GB | 2346288 A | | 8/2000 |
|---|---|---|---|
| JP | 2000-224287 | * | 8/2000 |
| JP | 2000-224287 A | | 8/2000 |
| JP | 2003-198668 A | | 7/2003 |
| JP | 2004-40321 | * | 2/2004 |
| JP | 2004-040321 A | | 2/2004 |
| JP | 2005-006260 | * | 1/2005 |
| JP | 2005-006260 A | | 1/2005 |
| JP | 2006-194697 | * | 7/2006 |
| JP | 2006-194697 A | | 7/2006 |
| JP | 3130051 | * | 3/2007 |
| JP | 3130051 U | | 3/2007 |

OTHER PUBLICATIONS

International Search Report of PCT/JP2007/065461, mailing date of Nov. 6, 2007.
Notification of Transmittal of Translation of the International Preliminary Report on Patentability (Form PCT/IB/338) of International Application No. PCT/JP2007/065461 mailed Mar. 4, 2010 with forms PCT/IB/373 and PCT/ISA/237.
Japanese Office Action dated Apr. 5, 2011, issued in corresponding Japanese Patent Application No. 2009-526291. (English translation of relevant portions).
Japanese Office Action dated Aug. 10, 2010, issued in corresponding Japanese Patent Application No. 2009-526291.

\* cited by examiner

*Primary Examiner* — Jacob Y Choi
*Assistant Examiner* — Anthony Arpin
(74) *Attorney, Agent, or Firm* — Westerman, Hattori, Daniels & Adrian, LLP

(57) ABSTRACT

A portable device includes a light emission unit to emit light on a case, a clocking unit to clock time, an information acquisition unit to acquire information indicating a position and/or a state necessary for illuminating the light emission unit, and a control unit to determine whether to illuminate the light emission unit by using timekeeping information acquired from the clocking unit and the information indicating a position and a state acquired from the information acquisition unit, and to control the light emission unit under either a light emission state or an extinction state from a result of the determination.

17 Claims, 15 Drawing Sheets

PORTABLE DEVICE, RECORDING MEDIUM STORING LIGHT EMISSION CONTROL PROGRAM AND LIGHT EMISSION CONTROL METHOD THEREOF

CROSS-REFERENCE TO RELATED APPLICATIONS

This application is a continuation of International Application No. PCT/JP2007/065461, filed on Aug. 7, 2007, now pending, herein incorporated by reference.

FIELD

The embodiments discussed herein are related to light emission control of a portable device such as a cellular phone for making a user (carrier) who carries the portable device to be recognized by others, for example, to a portable device using time during sunset and action of a carrier and so on as light emission conditions, a light emission control program and a light emission control method thereof.

BACKGROUND

There exists, for example, a position light as having a light emission function. By using this function, a driver, a cyclist, a pedestrian, etc. can recognize the presence of another pedestrian at night and the like.

Concerning light emission control of such light function, Japanese Laid-open Patent Publication No. 2000-224287 discloses that when a user uses an operation section of a portable telephone to enter a luminescence start instruction or a luminescence end instruction, an incoming call notice section, a display section and the operation section are made to light up or to finish luminescence thereof, or the luminescence thereof are also made to be finished after an entered luminescence time has passed (Abstract, FIGS. 3, 4, etc.).

A position light has the main object of making others recognize the presence of oneself. This object differs from light emission of, for example, a penlight for lightening the dark by oneself. When a position light is turned on with using a battery, it is able to escape unnecessary power consumption if a switch, etc. that switches from/to light emission to/from extinction by manual is provided.

When a timer is set for the light emission control thus a light is turned on according to an inputted time (Japanese Laid-open Patent Publication No. 2000-224287), a position light cannot be turned on even under the situation where the light is necessary, such as going out at night, unless the time for turning the light on is inputted. Therefore, the function of a position light of making others recognize the presence of oneself results being spoiled.

In the timer setting for emitting a light according to an inputted time, light is emitted till the setting time has passed even if the light emission is unnecessary. Then, an extinction operation thereof is needed. If the extinction operation is forgotten, vain power consumption is generated. If the light is driven by a battery, there is inconvenience of draining the battery.

Concerning such problems, there is no disclosure or suggestion thereof in Japanese Laid-open Patent Publication No. 2000-224287, and no suggestion about the structure for solving them is presented.

SUMMARY

According to an aspect of the embodiments of the present invention, a portable device includes a light emission unit to emit light on a case, a clocking unit to clock time, an information acquisition unit to acquire information indicating a position or a state or combination thereof necessary for illuminating the light emission unit, and a control unit to determine whether to illuminate the light emission unit by using timekeeping information acquired from the clocking unit and the information indicating a position or a state or combination thereof acquired from the information acquisition unit, and to control the light emission unit under either a light emission state or an extinction state from a result of the determination.

According to another aspect of the embodiments of the present invention, a computer-readable recording medium storing a light emission control program of a portable device having a light emission unit to emit light on a case, the program being executed by a computer, the recording medium includes clocking time, acquiring information indicating a position or a state or combination thereof necessary for illuminating the light emission unit, and determining whether to illuminate the light emission unit by using acquired timekeeping information and the acquired information indicating a position or a state or combination thereof, and controlling the light emission unit under either a light emission state or an extinction state from a result of the determination result.

According to another aspect of the embodiments of the present invention, a light emission control method of a portable device having a light emission unit to emit light on a case, the method includes clocking time, acquiring information indicating a position or a state or combination thereof necessary for illuminating the light emission unit, and determining whether to illuminate the light emission unit by using acquired timekeeping information and the acquired information indicating a position or a state or combination thereof, and controlling the light emission unit under either a light emission state or an extinction state from a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Other objects, features and advantages of the present invention will be more clearly understood by referring to the attached drawings and each of the embodiments.

DESCRIPTION OF EMBODIMENTS

According to an aspect of embodiments of the present invention, structure is that whether light emission conditions are met is determined by using information indicating a position and a state of a portable device together with timekeeping information such as date and time information, and that a light emission unit is illuminated or extinguished. That is, the timekeeping information is acquired from a clocking unit of a portable device or the like, and in addition, walk information and information indicating a position and/or a state of the portable device carried by a carrier are acquired from an information acquisition unit, and whether or not the light emission conditions are met is determined according to the acquired information. If the conditions are met, the light emission unit is illuminated.

According to such structure, the light emission unit can be automatically illuminated or extinguished according to date and time, and a position and/or a state. Thus, the light emission unit can be prevented from being forgotten to be extinguished, and vain power consumption can be held down. When the carrier of the portable device walks after sunset or, though the sun does not set, walks in a dark and danger place, the carrier can be protected by automatic light emission of the light emission unit.

First Embodiment

Figure 1:
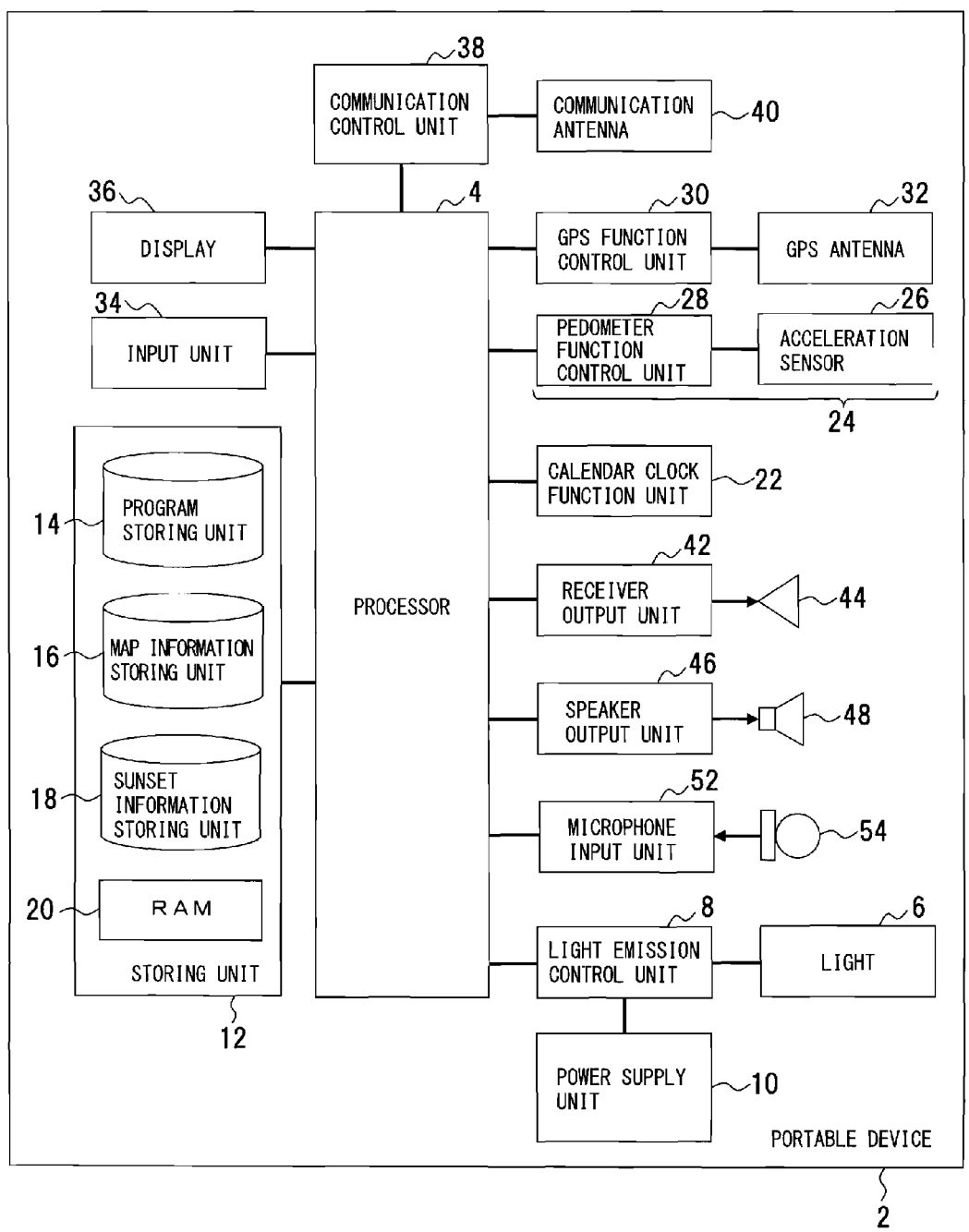
FIG. 1 is a block diagram depicting an example of structure of a portable device according to a first embodiment.

A first embodiment of the present invention will be described with reference to FIG. 1. FIG. 1 is a block diagram depicting an example of structure of a portable device according to the first embodiment.

This portable device 2 is, for example, a cellular phone, and includes a telephone function, a data communication function, a light emission function, a control function thereof, a clocking function, a pedometer function and a positioning function. The telephone function is a function making a call with another telephone via a base station by radio. The data communication function is a function transmitting and receiving a mail and data by packet communication. The light emission function emits light on the portable device 2, and is used for announcing to others the position of a user who carries the portable device 2, that is, the position of a carrier by light. The control function thereof is a function operating the light emission function if light emission conditions are met, and stopping the light emission function if the light emission conditions are not met.

The clocking function is a function clocking a day and time (date and time). The pedometer function is a counting function for the number of steps in walking indicating the state of the portable device 2 or a carrier thereof. The positioning function is a function plotting position information of the portable device 2. Concerning the light emission conditions of the light emission function, date and time information is acquired as conditions of time, etc. for light emission, such as sunset, by the clocking function. Walking information indicating that the carrier of the portable device 2 is in the outside is acquired as information indicating a state of the carrier of the portable device 2 by the pedometer function. Position information indicating that, for example, the portable device 2 is in the outside such as on a road, that is, the carrier is in the outside is acquired as the position of the portable device 2 by the positioning function. Therefore, if sunset time and the position and/or state of the carrier are set as the light emission conditions, and light is emitted when the light emission conditions are satisfied, the carrier can be recognized better by others. In addition, the light emission can be optimized according to the light emission conditions being met and not being met. Thus, vain power consumption can be reduced, and a very convenient portable device can be realized.

As structure for realizing such functions, a processor 4 is control unit performing control for realizing the above described telephone function, data communication function, light emission function, control function thereof, clocking function, pedometer function, positioning function, etc. The processor 4 is configured by a CPU (Central Processing Unit) or an MPU (Micro Processor Unit), and executes an OS (Operating System) and an application program. That is, this processor 4 constitutes control unit determining whether light emission unit is to be turned on by using timekeeping information and information indicating a position and/or state as the light emission conditions, and controlling the light emission unit under a light emission state or extinction state from a determination result thereof.

A light 6, which is one example of the light emission unit, is configured by, for example, an LED (Light Emitting Diode) as a light emitting device. The light 6 is connected to a power supply unit 10 via an light emission control unit 8 which is controlled by the processor 4. Power is supplied to the light 6 then the light 6 is emitted if the above described light emission conditions are met. Power supply is stopped then the light 6 is extinguished if the light emission conditions are not met. In this case, the light emission control unit 8 is provided. However, the structure may be available that the processor 4 directly controls the power supply unit 10.

A storing unit 12 is configured by a recording medium that records a program, etc., and includes a program storing unit 14, a map information storing unit 16, a sunset information storing unit 18 and a RAM (Random access memory) 20. A memory device is one example of the recording medium. The program storing unit 14 stores an OS and an application program. This program storing unit 14 also stores a program that determines whether the light emission conditions are met or not, and controls light emission and extinction based on determination thereof. The map information storing unit 16 stores map information and information, accompanying the map information, which indicates a specific area such as a danger area. Map information is used for specifying a position and a danger area, etc. based on positioning information. A specific area may be set by a user in advance, or by linking map information from a service provider. The sunset information storing unit 18 stores information indicating sunset time. Sunset information different in accordance with an area and a season is acquired from this stored information. For example, a data table for sunset information, etc. is set in the sunset information storing unit 18, and it is determined whether current time is during sunset, that is, at night or not correspondingly to date and time information. In this case, map information and sunset information may be downloaded from a data base on a network each time determination of light emission control is executed.

The RAM 20 configures a work area for developing an OS and an application program to realize various functions and control. In the light emission control, a determination process whether the light emission conditions are met or not is executed.

A calendar clock function unit 22 is clocking unit, and outputs timekeeping information as to time, a day, a month, a season, etc. This calendar clock function unit 22 may be configured so as to acquire timekeeping information from an outside network.

A pedometer function unit 24 is one example of detection unit detecting a position and a state of the carrier of the portable device 2, or information acquisition unit acquiring information thereof. In this case, acceleration generated by walking of the carrier is detected by an acceleration sensor 26, and a pedometer function control unit 28 counting the number of steps of a pedestrian from a change of the acceleration is provided. The pedometer function control unit 28 is one example of a walking detection unit, and can acquire an output indicating a state that the carrier walks. From the walking state, the fact that the carrier is in the outside can be known. These pieces of information can be used for the light emission conditions.

A GPS (Global Positioning System) function control unit 30 is positioning unit, and one example of information acquisition unit detecting a position of the portable device 2 or acquiring position information thereof. The GPS function control unit 30 provides a GPS antenna 32, and can plot the position of the portable device 2 by receiving a GPS electrical wave transmitted from a GPS satellite.

An input unit 34 is means for inputting various pieces of information, and provides a keyboard, etc. A display 36 is means for presenting information, and is configured by, for example, an LCD (Liquid Crystal Display) apparatus. This display 36 is one example of announcement unit, too, and can be used for warning announcement, etc. Concerning a specific area set on a map, when setting the specific area such as a danger area, the user can arbitrarily set the area on a map by the input unit 34 while confirming the map displayed on the display 36.

A communication control unit 38 is telephone function unit. The communication control unit 38 provides a communication antenna 40, and performs telephone communication and data communication with a base station by radio with using a predetermined frequency. A receiver output unit 42 outputs a voice signal such as a phone call, and reproduces the signal from a receiver 44 as voice. A speaker output unit 46 and a speaker 48 are one example of announcement means. The speaker output unit 46 outputs a voice signal such as a phone call, and reproduces the signal from the speaker 48 as voice. In this case, warning announcement may be constituted so as to be outputted to the speaker 48 via the speaker output unit 46. A microphone input unit 52 is voice input unit. The microphone input unit 52 converts voice inputted from a microphone 54 to an electric signal, and the electric signal is converted to a digital signal to be taken into the processor 4.

Figure 2:
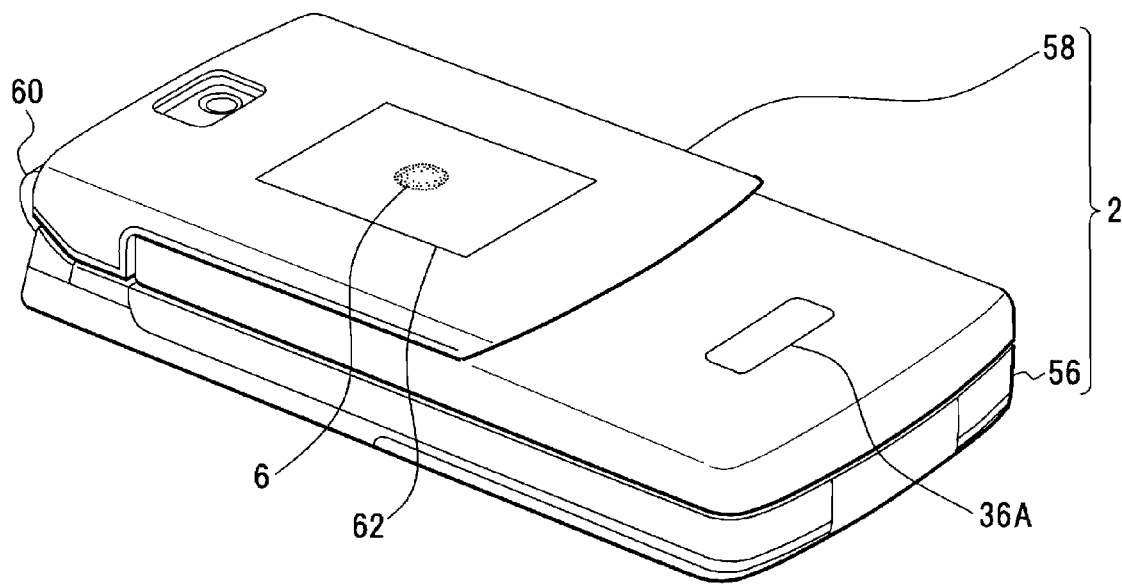
FIG. 2 is a perspective view depicting an example of exterior structure of the portable device.
Figure 3:
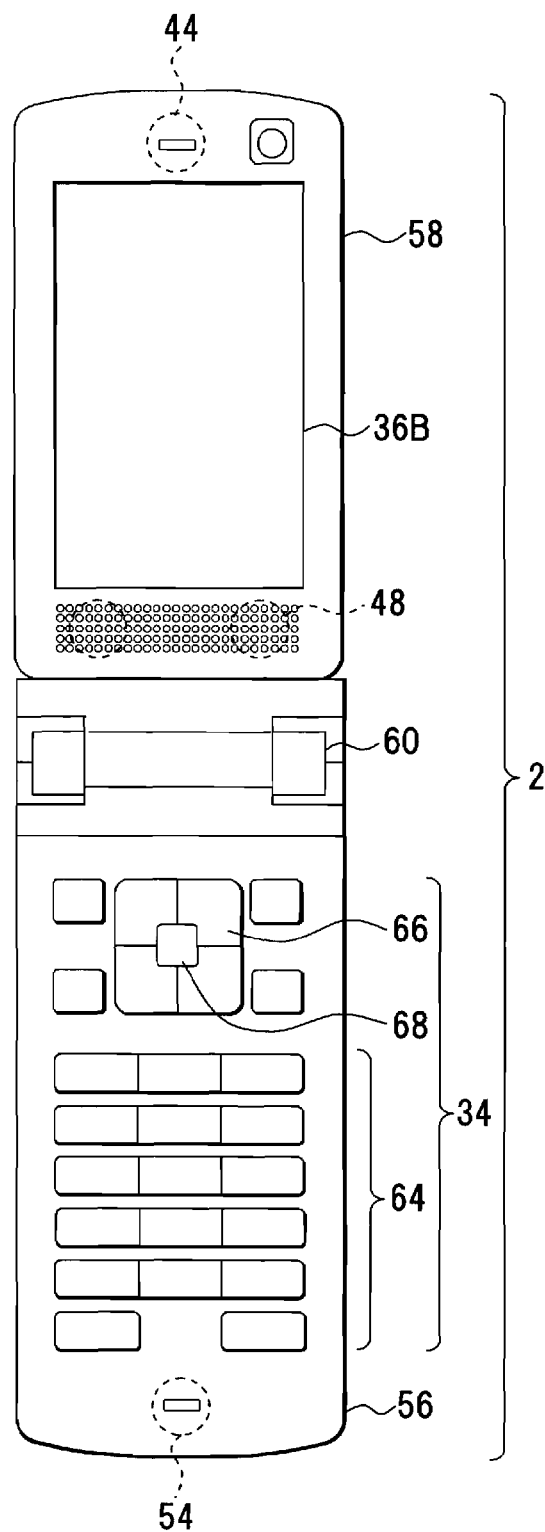
FIG. 3 depicts structure in a state that the portable device is opened.

An example of structure of the portable device will be described with reference to FIGS. 2 and 3. FIG. 2 is a perspective view depicting an example of the portable device where a light is mounted, and FIG. 3 depicts an opened state of the portable device. In FIGS. 2 and 3, the same components as described in FIG. 1 are denoted by the same reference numerals.

In this portable device 2, a first housing 56 and a second housing 58 are coupled via a hinge 60, and the portable device 2 is constituted so as to be openable and closable by the hinge 60. The portable device 2 is what is called a foldable cellular phone.

At a rear side of the housing 58 of this portable device 2, as depicted in FIG. 2, a light emission part 62 as the light emission unit emitting light on the housing and an exterior display 36A of the above described display 36 are placed. In the light emission part 62, the light 6 is built. That is, the light emission part 62 is constituted so as to emit light on the housing of the state that the housings 56 and 58 of the portable device 2 are closed, and make the carrier to be recognized. Thus, the light emission part 62 can be exposed on the outside surface of the housing 58 even if the portable device 2 is closed. Light emitted by the light emission part 62 makes the presence of the portable device 2 and the carrier to be recognized when the carrier carries the portable device 2 by holding it, by hanging it from a bag, by securing it to a belt, etc., which improves recognition thereof better.

On the housing 56 of the portable device 2, as depicted in FIG. 3, provided are a plurality of input keys 64, cursor keys 66 and an execution key 68 as the input unit 34. Along with them, the microphone 54, etc. are provided, thus inputs such as character input, numeral input and cursor input, and voice input are available. On the housing 58 side, provided are an interior display 36B, the receiver 44, the speaker 48, etc.

Figure 4:
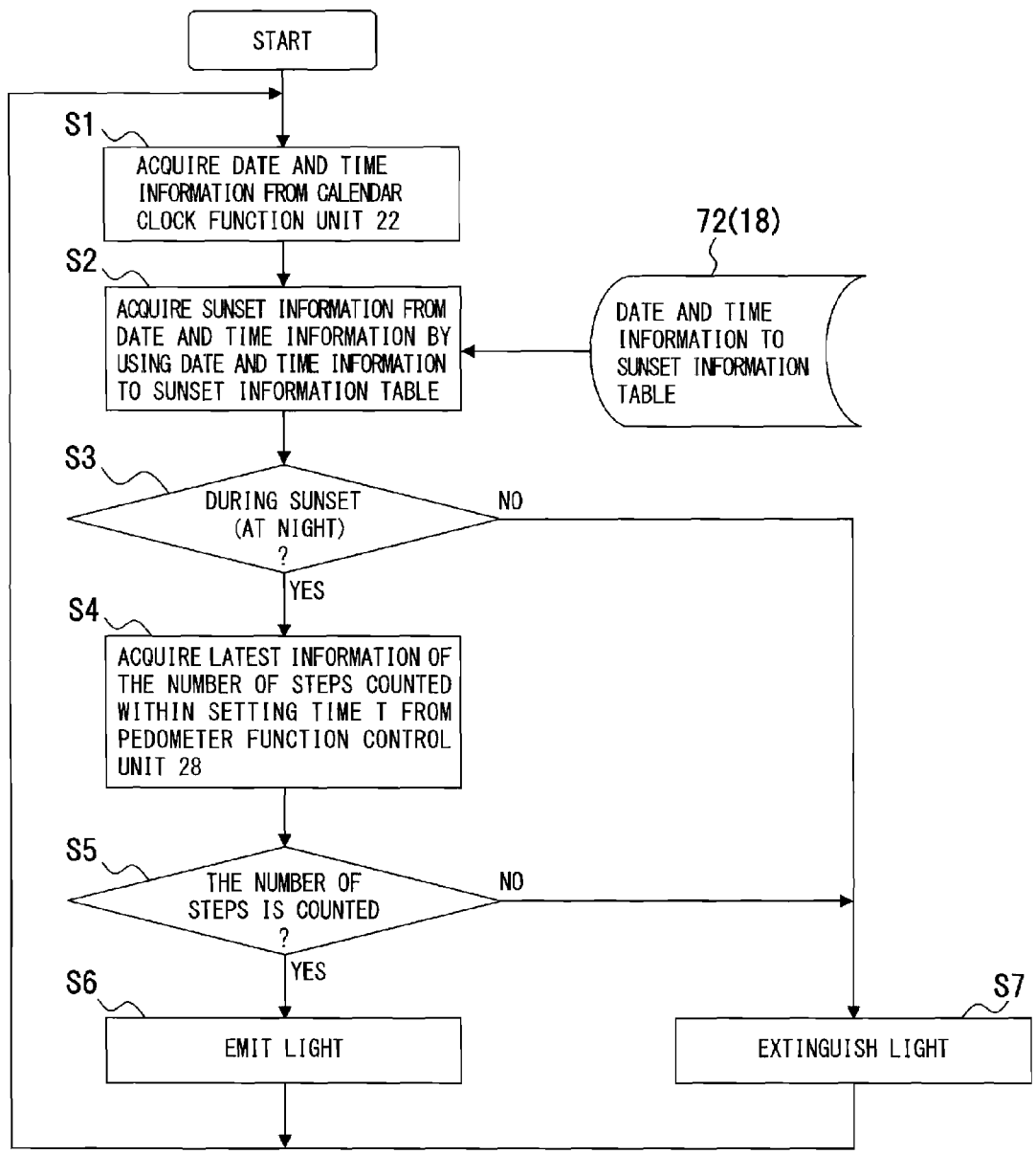
FIG. 4 is a flowchart depicting processing procedure of light emission control according to the first embodiment.

Light emission control of the light 6 will be described with reference to FIG. 4. FIG. 4 is a flowchart depicting processing procedure of light emission control according to the first embodiment.

This processing procedure is one example of a light emission control method and a light emission control program. In this embodiment, date and time information and information of the state of the carrier of the portable device 2 are acquired to determine whether to emit light (to meet the light emission conditions) or not. That is, if the carrier walks after sunset (at night), the light 6 is emitted. Whether to be after sunset (at night) or not is determined by date and time information. Whether to be in a state of walking or not is determined by information of the number of steps.

By a start of an operation, the processor 4 acquires date and time information from the calendar clock function unit 22 as timekeeping information (step S1). This date and time information is information indicating a month, a day and time. After this date and time information is acquired, sunset information corresponding to date and time which the date and time information indicates is acquired by using a date and time information to sunset information table 72 in the sunset information storing unit 18 (step S2). Since sunset time is different day by day, exact sunset information is held with reference to calendar information, that is, date and time. As a result, time or a time period necessary for light emission can be known. From midnight till early morning, dawn time can be known as well as sunset time. Thus, time necessary for extinction can be known.

From the acquired sunset information, whether to be during sunset (at night) is determined (step S3). If during sunset (YES of step S3), the latest information of the number of steps which indicates the number of steps counted for a setting time T as a predetermined time, for example, one minute is acquired from the pedometer function control unit 28 (step S4). The setting time T may be, for example, a predetermined time ascending from a time point where the time and date information is acquired.

Whether the number of steps is counted from information of the number of steps is determined (step S5). If the number of steps is counted (YES of step S5), a current state is that the carrier walks after sunset. Thus, power is supplied to the light 6 since the light emission conditions are met, the light 6 is emitted (step S6), and the process returns to step S1.

In step S3, unless during sunset (at night) (NO of step S3), power supply to the light 6 is stopped to extinguish the light 6 (step S7) and the process returns to step S1. Unless the number of steps is counted even if after sunset (NO of step S5), the light 6 is also extinguished (step S7) since the light emission conditions are not met, and the process returns to step S1.

If the light emission conditions are met like the above, the light 6 can be continuously emitted, and if the light emission conditions are not met, the light 6 can be distinguished.

In this case, one of the light emission conditions is during sunset (at night). However, it may not be limited only to being during sunset (at night). It maybe constituted so that the user can arbitrarily set and change a time condition of the light emission control. If the arbitrary light emission control time condition is set, whether to be time to perform the light emission control (a process corresponding to steps S2 and S3) may be determined by setting a light emission condition instead of using the date and time information to sunset information table 72.

In this processing procedure, the latest information of the number of steps is acquired within the setting time T in step S4. Since delay occurs to determination time whether to emit or distinguish the light 6, and to a start of light emission and distinction corresponding thereto according to the length of the setting time T, it may be configured that the user arbitrarily changes the setting time T. For the arbitrary change, the optimum time can be set.

Not only by the information of the number of counted steps but also by shaking detection, a light emission condition may be determined. Thereby, light can be emitted even if the carrier does not walk. The condition of the number of steps indicating the state is determined after the determination of date and time in advance. The process may be executed that the condition of the number of steps is determined in advance.

According to such structure, the light 6 of the portable device 2 can be emitted automatically in, for example, going outside during sunset (at night), thus, there needs no operation of switching from/to light emission to/from extinction by manual. In addition, it can be prevented that the light 6 is forgotten to be turned on if needed and to be extinguished if unneeded, then vain power consumption can be eliminated.

Second Embodiment

Figure 5:
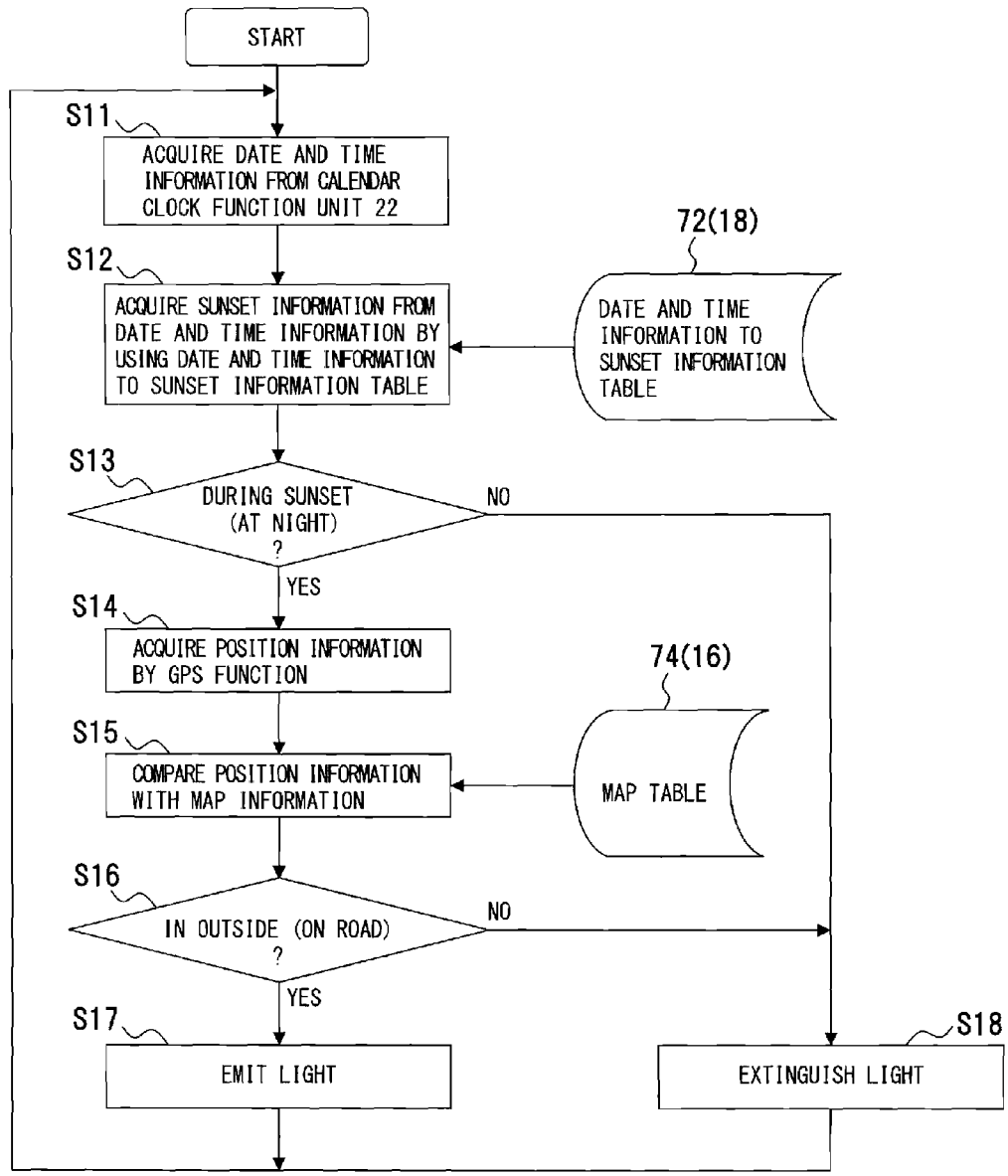
FIG. 5 is a flowchart depicting processing procedure of light emission control according to a second embodiment.

A second embodiment of the present invention will be described with reference to FIG. 5. FIG. 5 is a flowchart depicting processing procedure of light emission control according to the second embodiment.

This processing procedure is one example of a light emission control method and a light emission control program. In this embodiment, date and time information and position information of a portable device 2 are acquired to determine whether to emit light. If the carrier is, for example, in the outside (on a road) as a specific position on a map where light emission is needed after sunset, the light 6 is emitted.

In this processing procedure, as well as the first embodiment, executed are acquisition of date and time information from a calendar clock function unit 22 (step S11), acquisition of sunset information from a date and time information to sunset information table 72 by using the date and time information (step S12) and determination whether to be during sunset (at night) from the sunset information (step S13).

In this embodiment, if after sunset (YES of step S13), position information is acquired by a GPS function (step S14), the position information is compared with map information in a map table 74 by using a map table 74 in a map information storing unit 16 (step S15), and the position where the portable device 2 is present is pinpointed on the map.

Whether the portable device 2 is in the outside (on a road) (that is, the carrier is in the outside or not) is determined from the pinpointed position on the map (step S16). If the carrier is in the outside (YES of step S16), power is supplied to make the light 6 emit the light (step S17), and the process returns to step S11.

In step S13, unless during sunset (at night) (NO of step S13), power supply to the light 6 is stopped to extinguish the light 6 (step S18) and the process returns to step S11. Unless the carrier is in the outside even if it is after sunset (NO of step S16), power supply to the light 6 is stopped, the light 6 is extinguished (step S18), and the process returns to step S11.

According to such processing procedure, the light 6 can be emitted continuously and automatically as far as the carrier is in the outside after sunset. The emission of the light 6 can be automatically stopped when the carrier moves inside even if it is after sunset, or when the carrier is moving outside if it is not after sunset.

According to such structure, the light emission control of the light 6 is executed when the user carrying the portable device 2 is in the outside (on a road) at specific time such as night, thus, there is no need for switching from/to light emission to/from extinction of a light function by manual. In addition, it can be prevented that the light 6 is forgotten to be turned on and to be extinguished if unneeded, security is improved by enhancing recognition due to the light of the user, then vain power can be prevented.

This embodiment also may not be only limited to being during sunset (at night). It may be constituted so that the user can arbitrarily set and change a time condition of the light emission control. Concerning the determination of the light emission condition of the light 6, whether to be during sunset or not is determined in advance. Whether to be in the outside (on a road) or not by the GPS function may be determined in advance.

In the process that the position information obtained by the GPS function is compared with the map information (step S15), the map information stored in the map information storing unit 16 is used. It may be configured, for example, that necessary pieces of the map information are downloaded into the map information storing unit 16 from a map management server, etc. provided on a network as another example of structure. It may be also configured that the obtained position information is sent to a dedicated management server, etc. on a network and a comparison result between the position information and the map information is received by the portable device 2.

Third Embodiment

Figure 6:
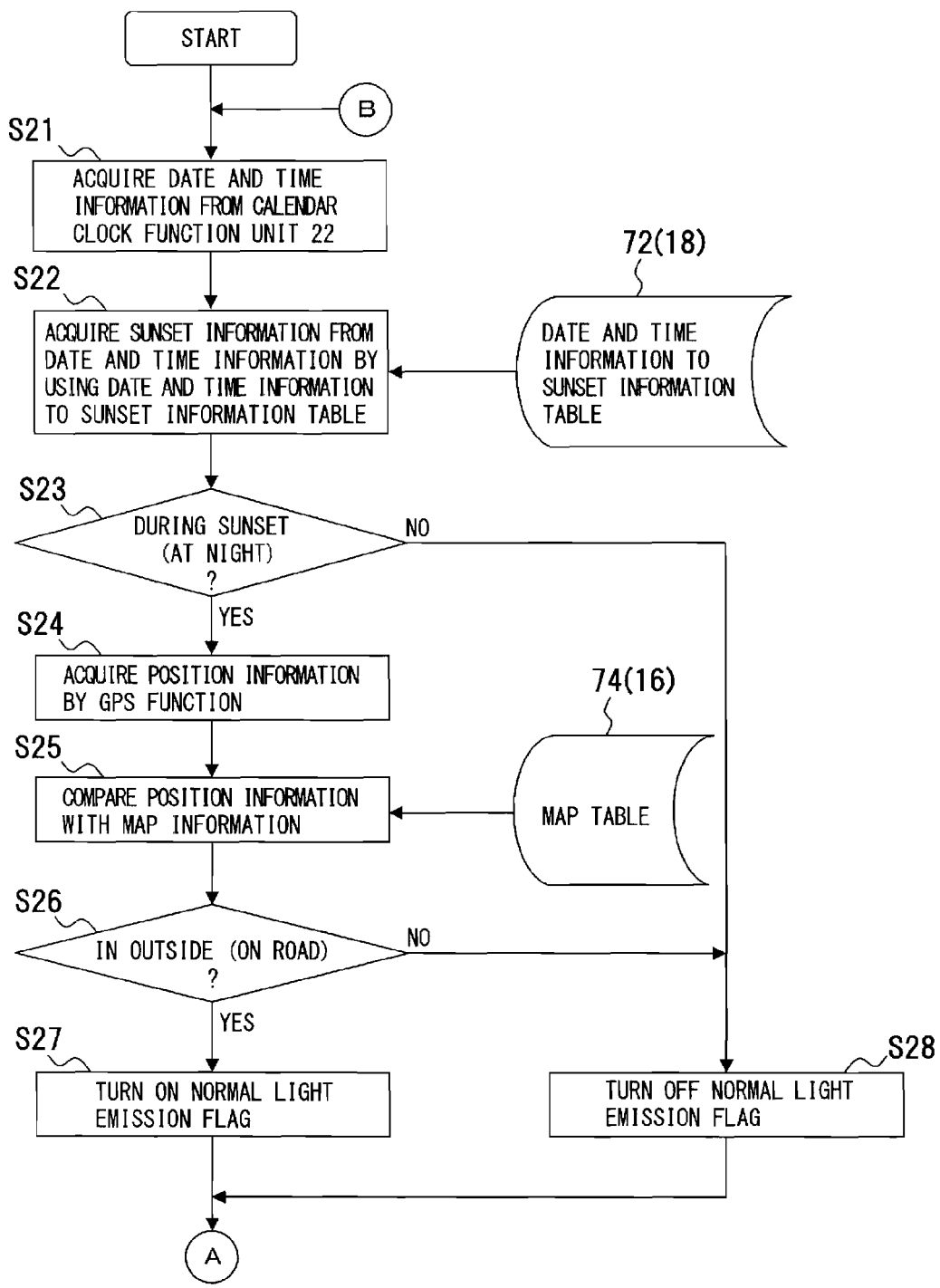
FIG. 6 is a flowchart depicting processing procedure of light emission control according to a third embodiment.
Figure 7:
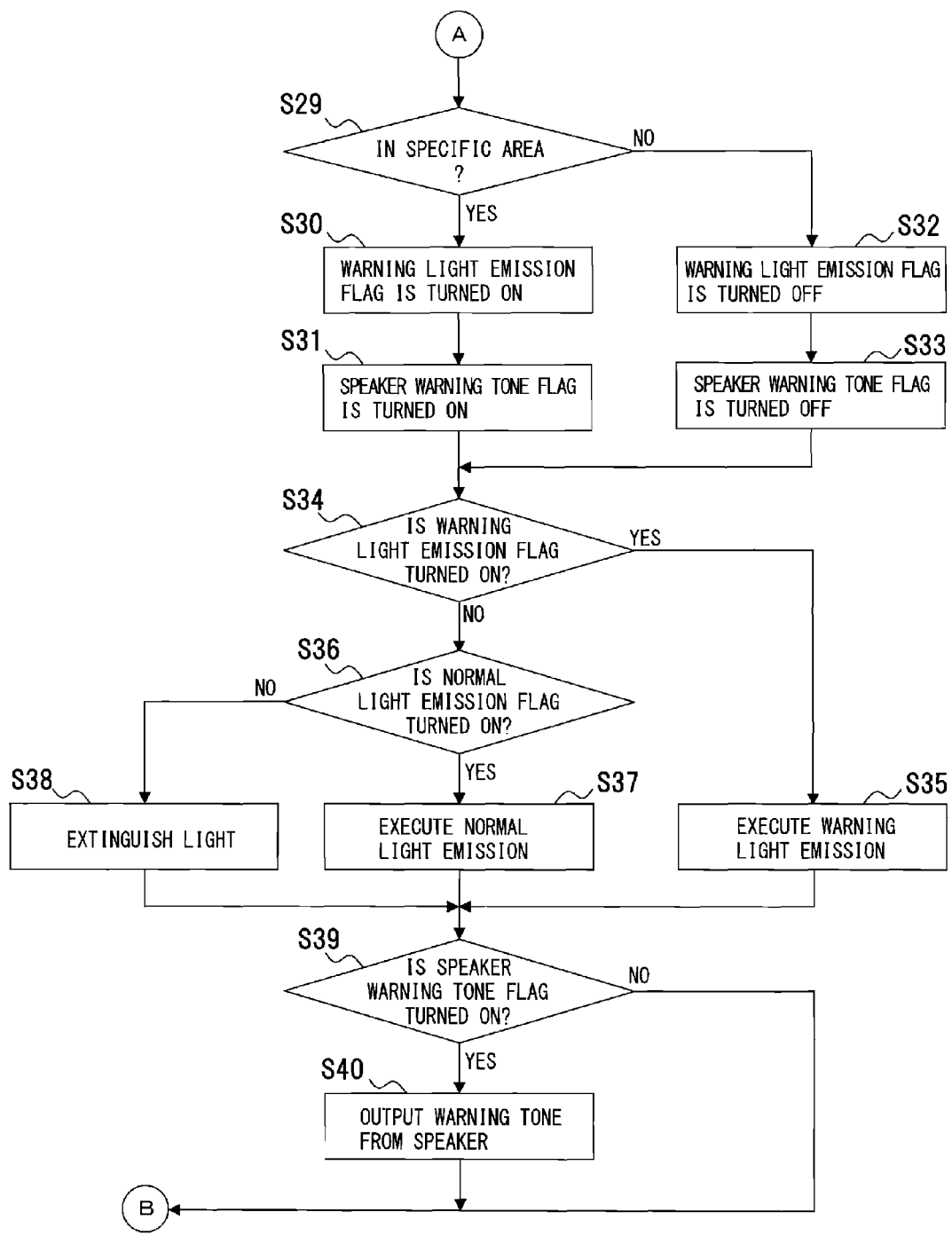
FIG. 7 is a flowchart depicting the processing procedure of the light emission control according to the third embodiment.

A third embodiment of the present invention will be described with reference to FIGS. 6 and 7. FIGS. 6 and 7 are a flowchart depicting processing procedure of light emission control according to the third embodiment. In FIGS. 6 and 7, A and B are connectors between the flowcharts.

This processing procedure is one example of a light emission control method and a light emission control program. In this embodiment, date and time information and position information of a portable device 2 are acquired to determine whether to emit light. Then, the light emission is switched between normal light emission, warning light emission with a warning tone and extinction in accordance with the position (area) of a carrier of the portable device 2. In the warning light emission, for example, flashing light emission is performed as the light emission by a light emission pattern different from the normal light emission.

In this processing procedure, as well as the second embodiment, executed are acquisition of date and time information from a calendar clock function unit 22 (step S21), acquisition of sunset information from a date and time information to sunset information table 72 by using the date and time information (step S22), determination whether to be during sunset (at night) from the sunset information (step S23), acquisition of position information by a GPS function (step S24) if it is after sunset (YES of step S23), comparison between map information from a map table 74 and the position information (step S25). Thereby, the position of the portable device 2 on the map is pinpointed.

In this embodiment, whether the portable device 2 is in the outside (for example, on a road), that is, whether the carrier is in the outside or not is determined from the pinpointed position on the map (step S26). If the carrier is in the outside (YES of step S26), a normal light emission flag is turned ON in a light emission control program of the light (step S27). If it is not after sunset in step S23 (NO of step S23) or if there is no carrier in the outside even if it is after sunset (NO of step S26), the normal light emission flag is turned OFF (step S28).

After such process, as depicted in FIG. 7, whether the portable device 2 is within a specific area, that is, whether the carrier is in the specific area is determined (step S29). Here, the specific area is a place necessary for light emission because lightning runs short, etc. and is pinpointed by a position and a range on a map. This specific area may be a specific area designated by a service provider in advance, and may be an area set by the user while seeing a map.

The above described position information and map information (steps S24 and S25) may be used for the determination whether to be in this specific area or not. If there is the portable device 2 in the specific area (YES of step S29), a warning light emission flag is turned ON (step S30), and a flag of a speaker warning tone is turned ON (step S31). If there is not the portable device 2 in the specific area (NO of step S29), the warning light emission flag is turned OFF (step S32), and the flag of the speaker warning tone is turned OFF (step S33).

Whether the warning light emission flag is turned ON or not is determined (step S34). If the warning light emission flag is turned ON (YES of step S34), the light 6 is made to perform warning light emission (step S35). If the warning light emission flag is not turned ON (NO of step S34), whether the normal light emission flag is turned ON or not is determined (step S36). If the normal light emission flag is turned ON (YES of step S36), the light 6 is normally emitted (step S37). If the normal light emission flag is not turned ON (NO of step S36), the light 6 is extinguished (step S38).

If the normal light emission is, for example, continuous light emission, the warning light emission is rendered a light emission form different from the normal light emission. For example, the warning light emission is flashing light emission and light emission changing a flashing period, light intensity and color thereof, and may be the combination of these light emission patterns.

After passing through this warning light emission, normal light emission or extinction of the light 6, it is determined whether the speaker warning tone flag is turned ON or not (step S39). If the speaker warning tone flag is turned ON, a warning tone is outputted from a speaker 48 (step S40), and the process returns to step S21. If the speaker warning tone flag is not turned ON (NO of step S39), the process returns to step S21.

Execution of such processing procedure can emit the light 6 normally and automatically if the carrier is in the outside (on a road) at night, etc. When the carrier is in the specific area such as a danger area or goes into the specific area, the normal light emission is switched to the warning light emission automatically, or the warning tone is generated to be able to notice the carrier of being in the specific area. Since in both the normal light emission and in the warning light emission, the light 6 is turned on only if the carrier is in the outside after sunset, and is extinguished if the carrier is not in the situation described above, light emission time is rendered proper. In addition, it can be prevented that the light is forgotten to be turned on and to be extinguished if unneeded, thus vain power can be eliminated. Area information to be warned such as a region of heavy traffic at night is specified in advance, which calls the user's attention by the warning tone or the warning light emission if the user enters the area. Thus, the embodiment is useful.

Figure 8:
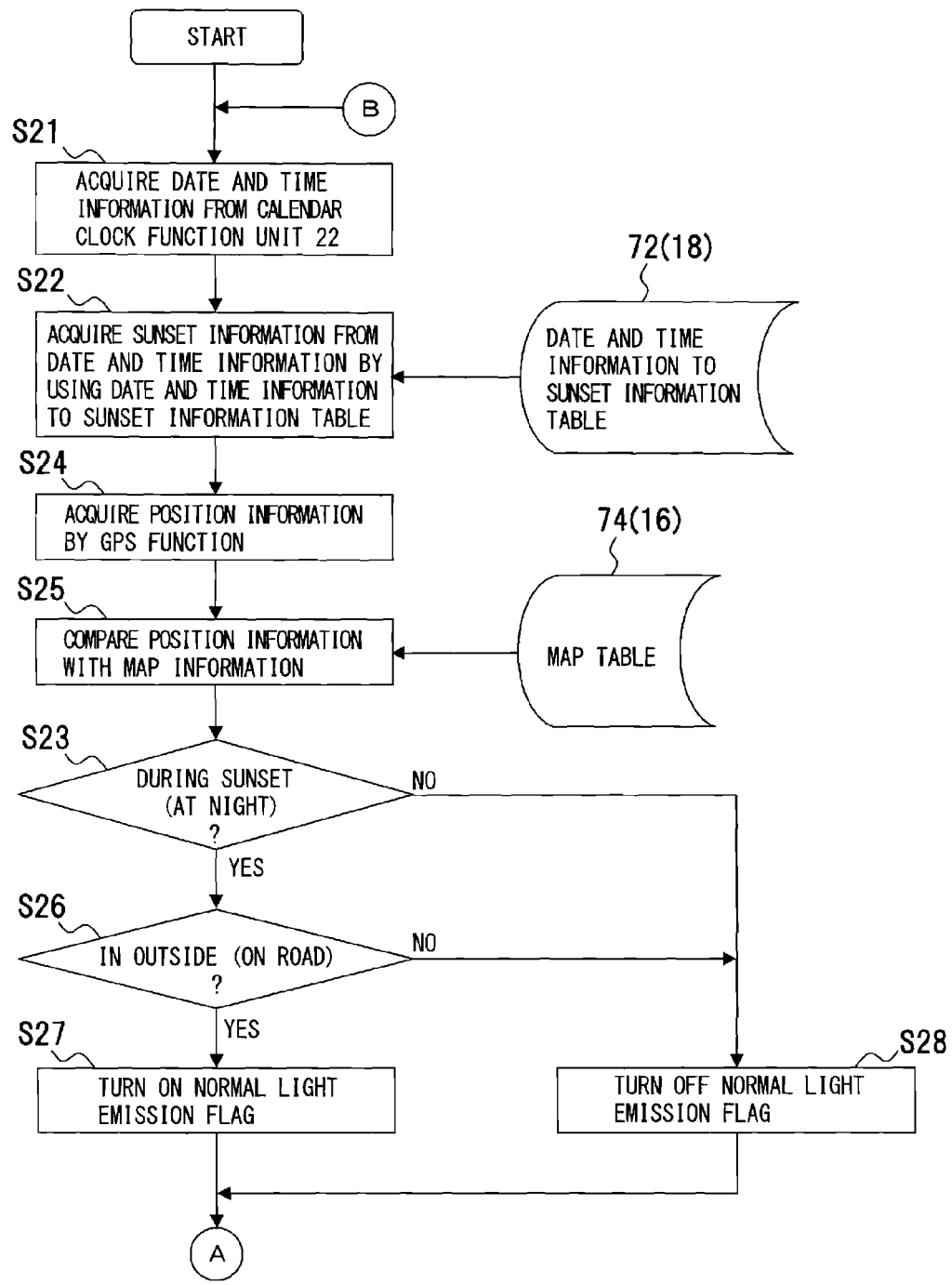
FIG. 8 is a flowchart depicting a variation of the processing procedure of the light emission control according to the third embodiment.

In this embodiment, after the determination whether to be during sunset or not (step S23), acquisition of the position information by the GPS function (step S24) and comparison between the position information and the map information (step S25) are executed. As depicted in FIG. 8, in a pre-step of the determination whether to be during sunset (step S23), the processing procedure maybe executed that the position information is acquired by the GPS function (step S24) and the position information is compared with the map information (step S25). In FIG. 8, the same components as described in FIG. 6 are denoted by the same reference numerals, and the explanation thereabout is omitted.

According to such structure, the same light emission control can be executed. Further, for example, if an area of heavy traffic irrelevant to the time during sunset (at night) is specified as a warning area, the normal light emission control is not executed as far as the condition of the time during sunset (at night) is not met. However, when it is determined that the carrier enters this specific area from the position information and the map information, the warning light emission is executed and attention can be called.

Fourth Embodiment

Figure 9:
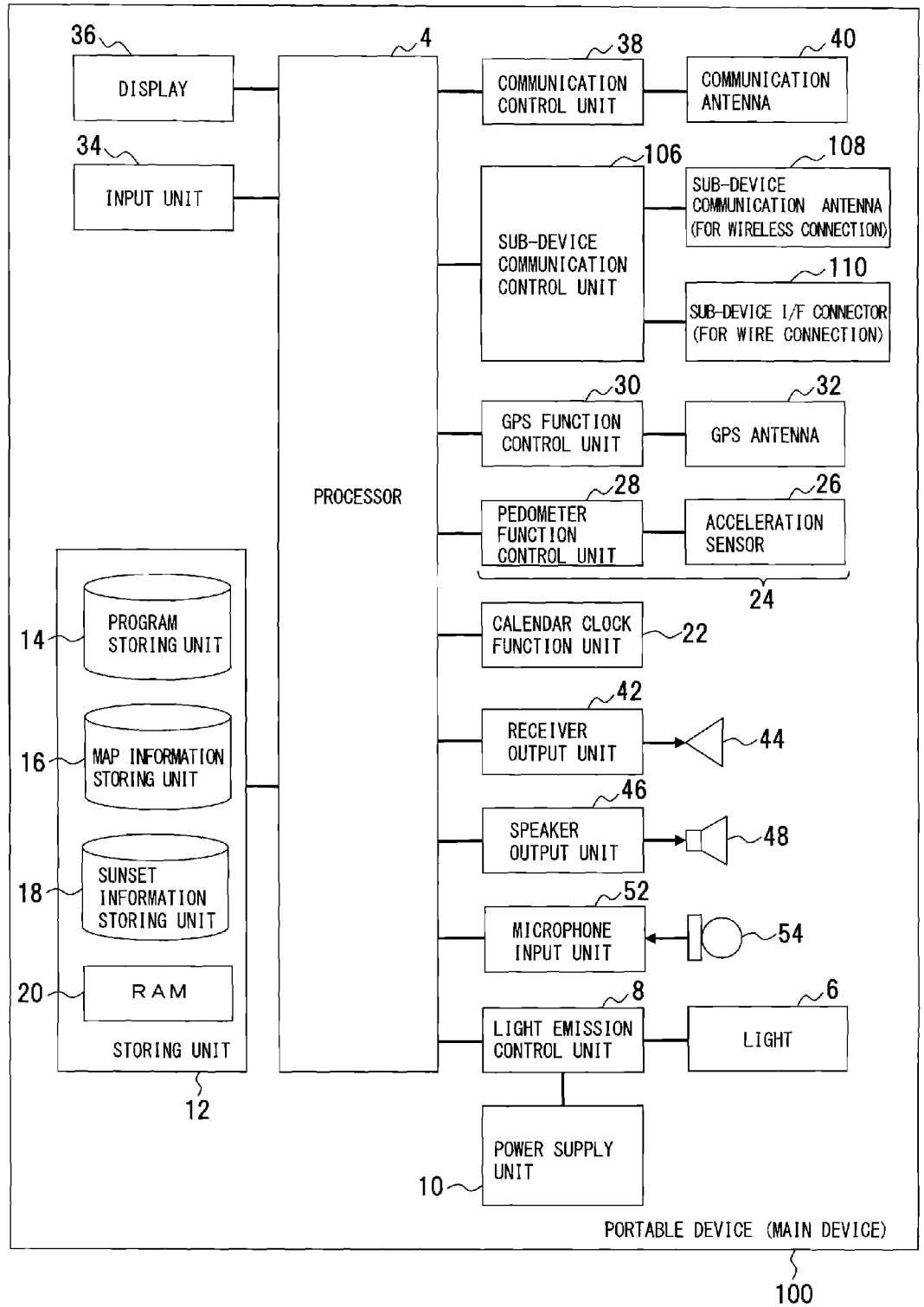
FIG. 9 is a block diagram depicting an example of structure of a portable device according to a fourth embodiment.
Figure 10:
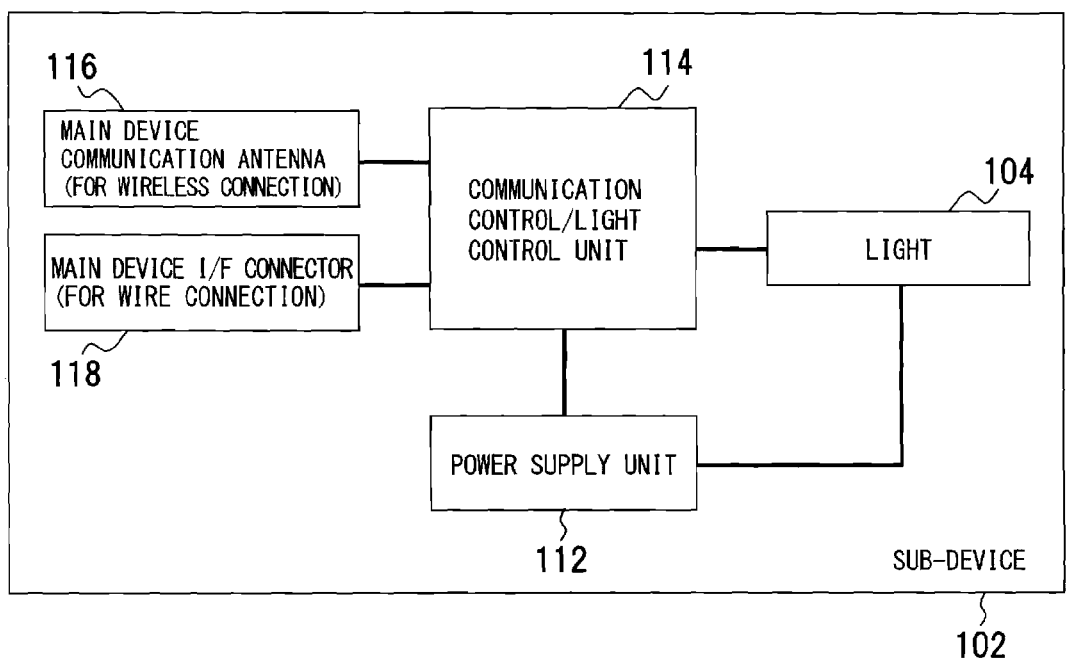
FIG. 10 depicts an example of structure of a sub-device.
Figure 11:
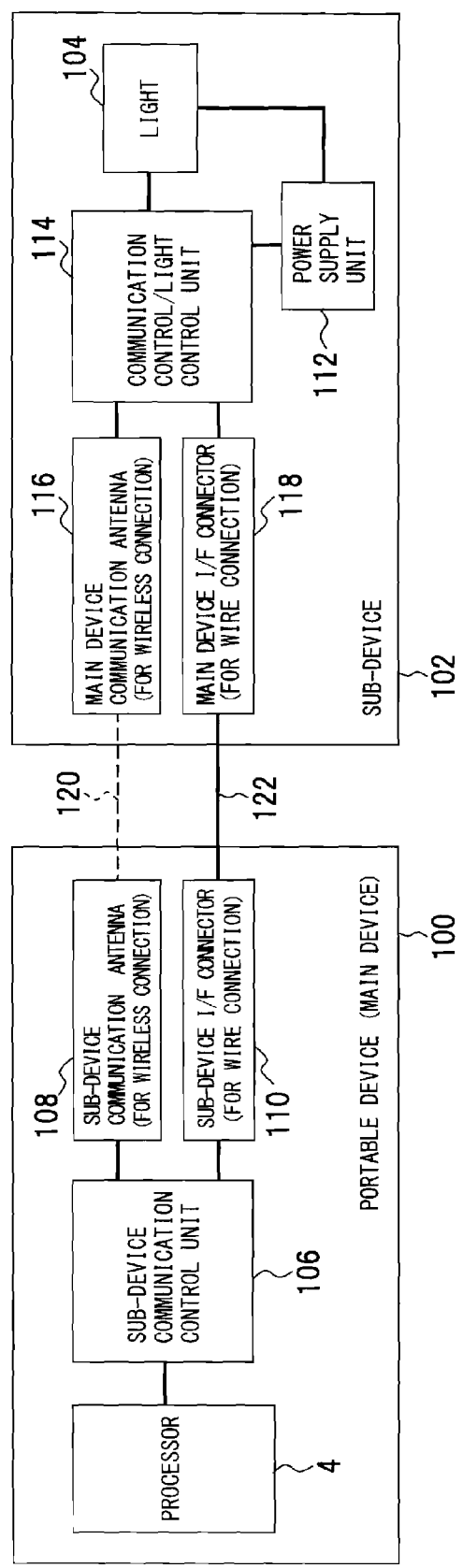
FIG. 11 depicts a connection state between the portable device and the sub-device.
Figure 12:
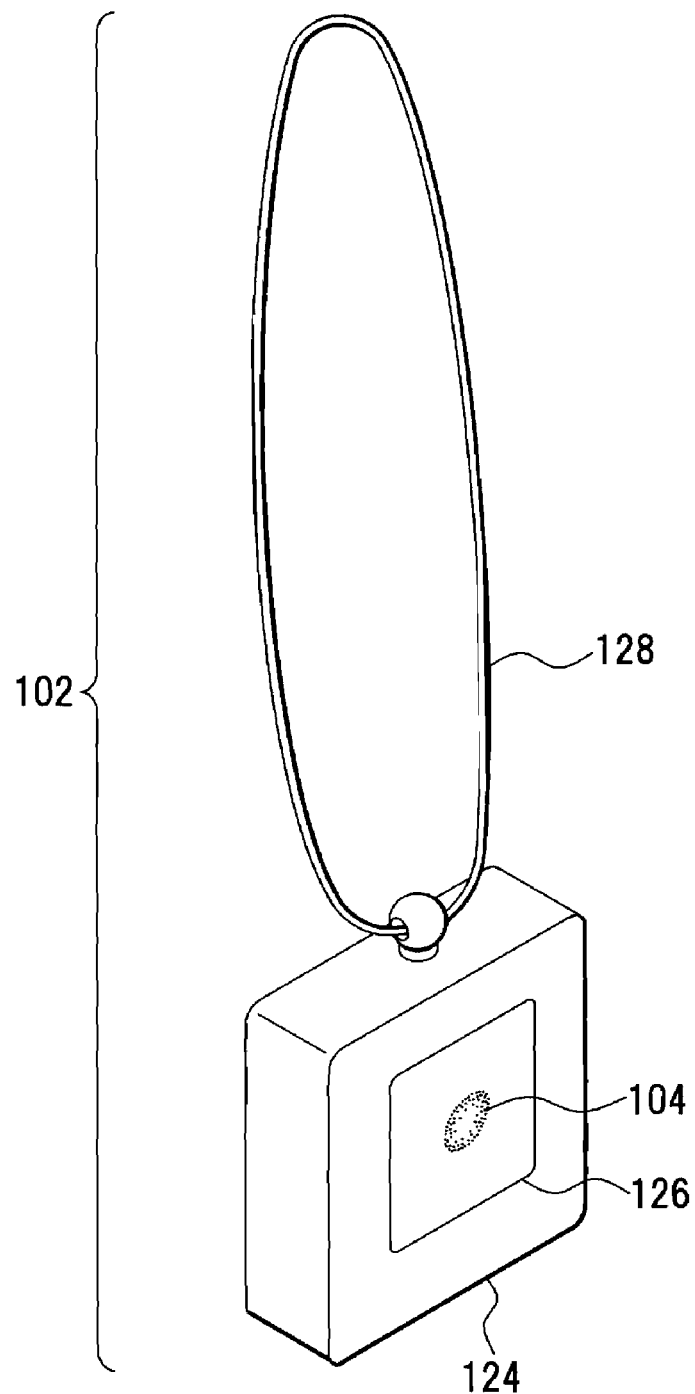
FIG. 12 depicts an example of structure of the sub-device.

A fourth embodiment of the present invention will be described with reference to FIGS. 9-12. FIG. 9 depicts structure of a portable device according to the fourth embodiment, FIG. 10 depicts structure of a sub-device, FIG. 11 depicts a connection state between the portable device and the sub-device and FIG. 12 depicts the sub-device. In FIG. 9, the same components as described in FIG. 1 are denoted by the same reference numerals, and the explanation thereabout is omitted.

In this fourth embodiment, a portable device 100 as a base device is provided, and a sub-device 102 that is connected to this portable device 100 is provided. Light emission of a light 104 as light emission unit mounted on the sub-device 102 is controlled. This light emission control is the same as that of the light 6 in the above described embodiments. The portable device 100 corresponds to the portable device 2 of the above described embodiments. A different point from the portable device 2 is that structure for wireless communication or wire connection with the sub-device 102 is provided. That is, for wireless connection, a near field wireless communication function such as Bluetooth, an infrared communication function, etc. can be used, and for wire connection, a cable is used. On the portable device 100, a sub-device communication control unit 106 controlled by the processor 4 is mounted. For this sub-device communication control unit 106, a sub-device communication antenna 108 for wireless connection and a sub-device interface (I/F) connector 110 for wire connection are provided.

The sub-device 102 is means carried separately from the portable device 100, and configured so that light emission thereof is controlled by the portable device 100. On the sub-device 102, as depicted in FIG. 10, a power supply unit 112 for supplying power to the light 104 and a communication control/light control unit 114 as control unit for executing light emission control of the light 104 and communication control with the portable device 100 are placed. In this case, when infrared-ray is used for a communication medium, the light emission part for infrared-ray may be provided at the portable device 100 side, and a light receiving part therefor may be provided at the sub-device 102 side. The power supply unit 112 may be, for example, configured by a rechargeable battery.

To the communication control/light control unit 114, a base device communication antenna 116 corresponding to the sub-device communication antenna 108 of the portable device 100 and a base device I/F connector 118 corresponding to the sub-device I/F connector 110 are connected.

As to the portable device 100 and the sub-device 102, as depicted in FIG. 11, the sub-device communication antenna 108 of the portable device 100 and the base device communication antenna 116 can be connected by radio via an electrical wave 120, or can be connected by wire via a connection cable 122 between the sub-device I/F connector 110 and the base device I/F connector 118. The portable device 100 and the sub-device 102 can be connected by radio or wire. The light emission of the light 104 of the sub-device 102 can be controlled by the portable device 100.

The sub-device 102 provides, as depicted in FIG. 12, a light emission part 126 that emits the light by the light 104 as light emission unit for a housing unit 124. If a strap 128 is provided for the housing unit 124, the sub-device 102 can easily be attached to a human body, a bag, etc. The sub-device 102 may be made to be carried by an animal such as a dog during a walk, other than a human body.

The power supply unit 112 is mounted on the sub-device 102. If the structure is that wire connection is performed using the connection cable 122, power may be supplied from the portable device 100 that is the base device. In this case, the power supply unit 112 is not necessary. If the power supply unit 112 is provided, the structure may be that a battery of the power supply unit 112 is charged from the portable device 100.

In this embodiment, the light 6 and the light emission control unit 8 are also mounted on the portable device 100 that is the base device. If such sub-device 102 is provided, the light 6 at the portable device 100 side may be omitted.

As the above, if the portable device 100 as the control unit that control light emission of the sub-device 102 is separated from the sub-device 102 as a light emission source, the sub-device 102 maybe carried at the position where the sub-device 102 can be seen from the outside. Thus, the carrier is loosen from the restriction so as not to interrupt the light emission part 62 (FIG. 2) of the portable device 100, and there becomes no inconvenience of poorer visibility due to hiding of the light emission part 62. Therefore, the portability of the portable device 100 is improved. The visibility by the light emission at the sub-device 102 side is improved.

Other Embodiments

In the above embodiments, it is exemplified that walking outside after sunset is set as the light emission condition of the light 6, and that the light 6 is emitted in accordance with the position or the area of the portable device 2 after sunset. The above embodiments do not limit the present invention to these light emission conditions. A date and time condition, action of the carrier and a position condition may be combined, or light emission conditions desired by a user may be set in advance to choose a light emission condition.

Figure 13:
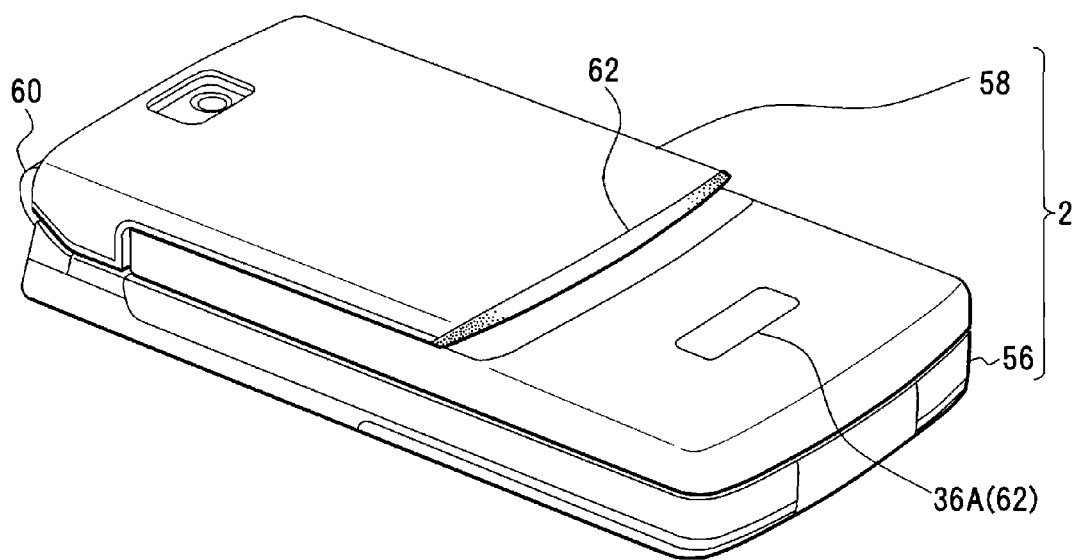
FIG. 13 depicts a portable device according to other embodiment.

In the above embodiments, the structure is exemplified that the light emission part 62 (FIG. 2) is installed on the housing unit 58 of the portable device 2. As depicted in FIG. 13, the light 6 may be built into the inside of the housing unit 58, and a step may be provided in the middle of the housing unit 58 to install the light emission part 62.

The exterior display 36A may be used as the light emission part 62. The exterior display 36A can be used as light emission unit by increasing light emission luminescence thereof. Using such existing exterior display 36A or using the exterior display 36A along with light emission from the light emission part 62 can increase the amount of light emission and can improve the visibility from far away.

Figure 14:
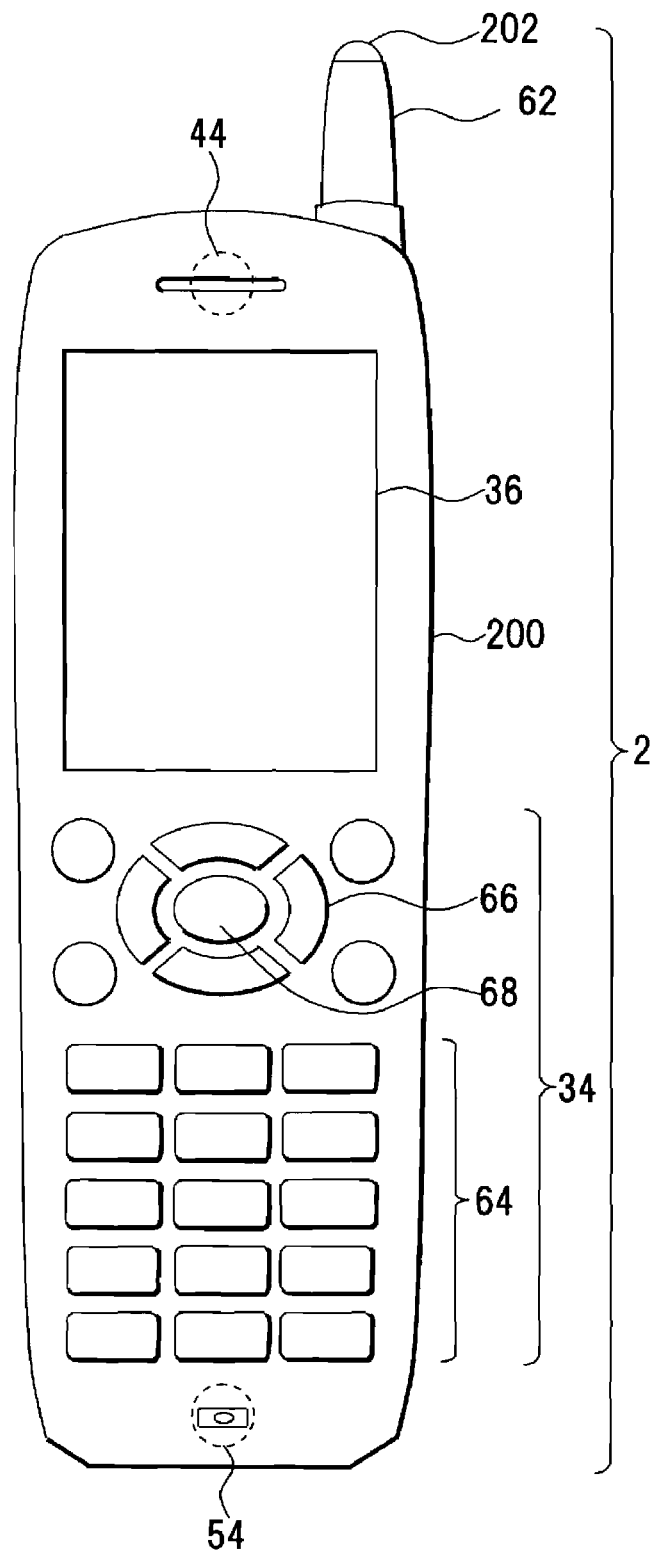
FIG. 14 depicts a portable device according to other embodiment.

In the above embodiments, the portable device 2 has foldable structure. The present invention may be applied, as depicted in FIG. 14, to the portable device 2 having flat and slidable housing structures. In FIG. 14, the same components as described in FIGS. 2 and 3 are denoted by the same reference numerals.

This portable device 2 provides a single casing 200, and at the top of the casing 200, an antenna 202 is installed. On this antenna 202, the above described light emission part 62 is placed as light emission unit. For this light emission part 62, the above described light 6 is provided. In this case, as described above, the display 36 may be used as the light emission unit, too.

Figure 15:
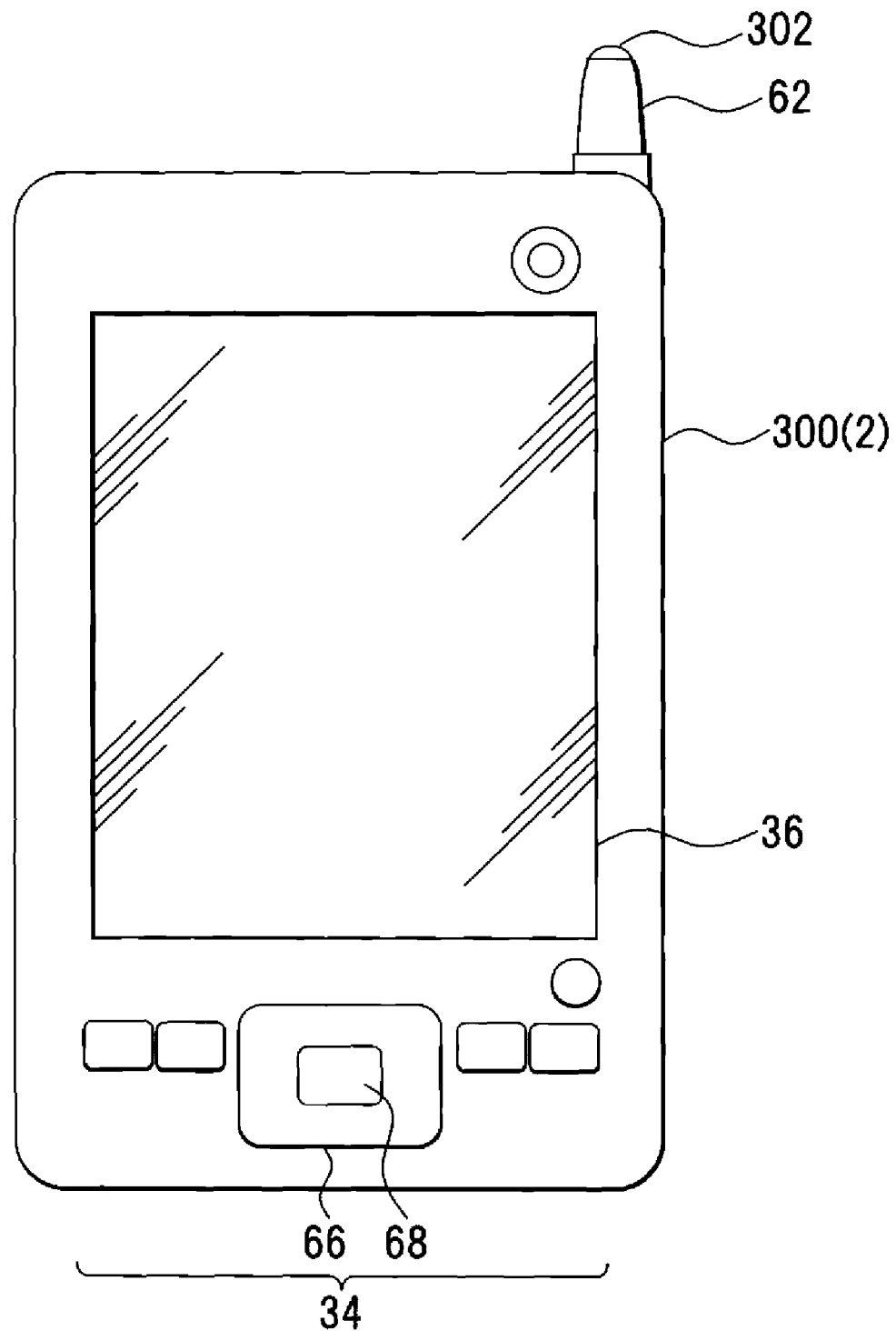
FIG. 15 depicts a PDA according to other embodiment.

In the above embodiments, a cellular phone is illustrated as the portable device 2. As depicted in FIG. 15, a PDA (Personal Digital Assistant) 300 and a portable PC (Personal Computer) may be used. In such structure, the light emission part 62 is provided at a part of the display 36 as the light emission unit and the antenna 302, and light is emitted by meeting the above described light emission conditions. Thereby, a carrying user can be recognized better.

In the portable device 2 having a plurality of light emission unit, light emission unit for normal light emission and light emission unit for warning light emission are placed separately, and the normal light emission and the warning light emission may be executed separately.

The processing described in the disclosed embodiments can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, MW (middleware software), database management software or network, may execute one part of each processing to realize the embodiments.

Furthermore, the memory device is not limited to a device independent from the computer. The memory device may be provided in the device. The memory device includes a memory device in which a program is stored by downloading the program transmitted through a LAN or the Internet. Furthermore, the memory device is not limited to one. In the case that the processing of the embodiments is executed by a plurality of memory devices, a plurality of memory devices may be included in the memory device. The component of the device may be arbitrarily composed.

A computer may execute each processing stage of the embodiments according to the program stored in the memory device. Those skilled in the art will appreciate that a computer includes a processing unit in an information processor, a microcomputer, and so on. In short, the equipment and the apparatus that can execute the functions in embodiments using the program are generally called the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

Technical ideas extracted from the embodiments of the present invention described above will then be listed. The technical ideas of the present invention may be comprehended at various levels and variations ranging from higher to lower conceptions and the present invention is not limited to the following description.

A portable device includes a light emission unit to emit light on a case, a clocking unit to clock time, an information acquisition unit to acquire information indicating a position and a state necessary for illuminating the light emission unit, and a control unit to determine whether to illuminate the light emission unit by using timekeeping information acquired from the clocking unit and the information indicating a position or a state or combination thereof acquired from the information acquisition unit, and to control the light emission unit under either a light emission state or an extinction state from a result of the determination.

According to such structure, the timekeeping information acquired from the clocking unit and information indicating a position and/or a state acquired from the information acquisition unit are used, and it is determined whether the light emission unit is to be illuminated or not, that is, whether to meet light emission conditions. Concerning the position and/or the state referred to for this determination of the light emission conditions, the position, which is a position of the portable device, indicates a position of a carrier who carries the portable device. The state indicates an action state of the carrier such that whether the carrier walks in the outside or not.

According to meeting the light emission conditions or not, if the light emission unit is during extinction, the light emission unit is automatically emitted by meeting the light emission conditions. If the light emission unit is during emission, the light emission unit is automatically extinguished by lack of the light emission conditions.

In the above portable device, preferably, the information acquisition unit may be a walking detection unit to output walking information indicating whether a carrier of the portable device walks or not. That is, if the walking information is acquired, it can be assumed that the carrier walks in the outside. If the portable device provides a pedometer function, the function can be utilized.

In the above portable device, preferably, the information acquisition unit may be a positioning unit to detect a position of the portable device. That is, if positioning information is acquired, a position of the portable device can be known, thereby, it can be known whether the carrier is in the outside due to, for example, walking or the inside. If the portable device provides a positioning function, the function can be utilized.

In the above portable device, preferably, the light emission unit may include a light emission part at an outside of the case. If the light emission part is included at the outside of the case, light emission can be recognized from the outside.

In the above portable device, preferably, the light emission unit may include a light emission part at an antenna. If the antenna is installed outside the case, light emission can be easily recognized by including the light emission part at the antenna. If the portable device provides the light emission function with the antenna function, the light emission function can be utilized.

In the above portable device, preferably, an information display unit may be used as the light emission unit. If an LCD (Liquid Crystal Display) or the like is installed on the outer surface of the portable device, the LCD or the like can be utilized as the light emission unit.

In the above portable device, preferably, the clocking unit may obtain timekeeping information from the outside. The clocking unit can use not only timekeeping information as interior information of the portable device but also timekeeping information acquired from the outside.

The above portable device preferably may include a storing unit to store map information, wherein the control unit refers position information acquired by the information acquisition unit and the map information read from the storing unit, determines whether the portable device is on a road or not from a position on a map, and uses a result of the determination for light emission control of the light emission unit. The information indicating whether the portable device is on a road or not indicates whether the carrier of the portable device walks on a road or not.

The above portable device preferably may include a display to display a position of the portable device with the map information. The position of the portable device indicates the position of the carrier.

In the above portable device, preferably, the control unit may refer the timekeeping information and the information indicating a position or a state or combination thereof, and controls a light emission state of the light emission unit. Here, the light emission state is a state such as luminosity and color of the light emission.

In the above portable device, preferably, the light emission state is at least one of flashing, a flashing period, light intensity and color of the light emission unit. The carrier can be recognized better according to variation of the light emission states.

The above portable device preferably may include an announcement unit to announce the position or the state, wherein the control unit determines whether the portable device moves to the position or the state or combination thereof, and operates the announcement unit based on a result of the determination. Visibility by others can be enhanced by combined use of the light emission function and the announcement unit.

A computer-readable recording medium storing a light emission control program of a portable device having a light emission unit to emit light on a case, the program being executed by a computer, the recording medium includes clocking time, acquiring information indicating a position or a state or combination thereof necessary for illuminating the light emission unit, and determining whether to illuminate the light emission unit by using acquired timekeeping information and the acquired information indicating a position or a state or combination thereof, and controlling the light emission unit under either a light emission state or an extinction state from a result of the determination.

The above recording medium preferably may include making a walking detection unit output walking information indicating whether a carrier of the portable device walks or not.

The above recording medium preferably may include making a positioning unit detect a position of the portable device.

The above recording medium preferably may include reading map information from a storing unit, referring acquired position information and the map information read from the storing unit, and determining whether the portable device is on a road or not from a position on a map, wherein a result of the determination is used for light emission control of the light emission unit.

The above recording medium preferably may include determining whether the portable device moves to the position or the state, or not, and instructing an announcement unit to operate based on a result of the determination.

A light emission control method of a portable device having a light emission unit to emit light on a case, the method includes clocking time, acquiring information indicating a position or a state or combination thereof necessary for illuminating the light emission unit, and determining whether to illuminate the light emission unit by using acquired timekeeping information and the acquired information indicating a position or a state or combination thereof, and controlling the light emission unit under either a light emission state or an extinction state from a result of the determination.

The above light emission control method preferably may include outputting walking information indicating whether a carrier of the portable device walks or not.

The above light emission control method preferably may include detecting a position of the portable device.

The above light emission control method preferably may include acquiring timekeeping information from an outside.

The above light emission control method preferably may include reading map information from a storing unit, and referring acquired position information and the map information read from the storing unit, and determining whether the portable device is on a road or not from a position on a map, wherein a result of the determination is used as light emission control of the light emission unit.

The above light emission control method preferably may include displaying a position of the portable device with the map information on a display.

The above light emission control method preferably may include referring the timekeeping information and the information indicating a position or a state or combination thereof, and controlling a light emission state of the light emission unit.

The above light emission control method preferably may include determining whether the portable device moves to the position or the state or not, and announcing the position or the state based on a result of the determination by an announcement unit.

According to the embodiments discussed herein, the following effects can be obtained.

a. A light emission unit that emits the light outside a case of a portable device is provided, and whether light emission conditions are met or not is monitored with referring to timekeeping information and information indicating a position or a state to automate light emission and extinction of the light emission unit. Thus, a user is not forced to determine whether to emit or extinguish the light, the light emission unit can be illuminated according to time and a place if needed, then, the user can be recognized better with using light.

b. Light emission at time and a place in unneeded can be prevented, vain power consumption can be avoided, and operation for extinction becomes unnecessary.

c. Since user operation is not one of the conditions, forgetting to extinguish the light emission unit can be prevented, and power consumption in vain can be eliminated.

d. The light emission unit can be illuminated if needed and extinguished if unneeded. Automation thereof can make light emission or extinction proper, and vain power consumption can be suppressed.

e. If a light emission level of the light emission unit is adjusted if needed, security can be enhanced according to adjusted levels.

f. If area information is set as the light emission conditions of the light emission unit, warning light emission can be executed when the user enters the area, etc. Thus, the user can be recognized better. Or, the user oneself can recognize one's entrance to the area, the attention can be called as to entrance to a specific area, and security of the user can be enhanced.

While the most preferred embodiments of the present invention have been described hereinabove, the present invention is not limited to the above embodiments, and it is a matter of course that various variations and modifications can be made by those skilled in the art within the scope of the claims without departing from the spirit of the invention disclosed herein, and needless to say, such variations and modifications are also encompassed in the scope of the present invention.

The embodiments discussed herein are related to a portable device, a recording medium storing a light emission control program and a light emission control method. The light emission unit that make the others recognize a user who carries a portable device is controlled in accordance with specific timekeeping information and information representing a state and a position. Thus, the control is executed so that light is emitted if needed, and is not emitted if unneeded. As a result, security of the user can be ensured, vain power can be suppressed, and, if the user enters a specific area, the attention can be raised for user oneself and surroundings thereof. Then, the user carrying a portable device can be recognized better, and the security of the user during a walk can be ensured by the light emission of the portable device. The embodiments discussed herein are useful.

What is claimed is:

1. A portable device comprising:
a light emission unit to emit light on a case;
a clocking unit to clock time;
an information acquisition unit to acquire position information indicating a position necessary for illuminating the light emission unit;
a storing unit to store map information; and
a control unit to determine whether to illuminate the light emission unit by using timekeeping information acquired from the clocking unit and the position information acquired from the information acquisition unit, and to control the light emission unit under either a light emission state or an extinction state from a result of the determination,
wherein the control unit refers to the position information acquired by the information acquisition unit and the map information read from the storing unit, determines whether the portable device is on a road or not from a position on a map, and uses a result of determining whether the portable device is on a road or not, for light emission control of the light emission unit.

2. The portable device of claim 1, wherein
the information acquisition unit includes a walking detection unit to output walking information indicating whether a carrier of the portable device is walking or not, and acquires information indicating a state necessary for illuminating the light emission unit, and
the control unit determines whether to illuminate the light emission unit by using timekeeping information acquired from the clocking unit and the information indicating a state acquired from the information acquisition unit, and controls the light emission unit under either the light emission state or the extinction state from a result of the determination.

3. The portable device of claim 1, wherein
the information acquisition unit is a positioning unit to detect a position of the portable device.

4. The portable device of claim 1, further comprising:
a display to display a position of the portable device with the map information.

5. The portable device of claim 1, wherein
the control unit refers to the timekeeping information and the position information, and controls a light emission state of the light emission unit.

6. The portable device of claim 1, further comprising:
an announcement unit to announce the position, wherein
the control unit determines whether the portable device has moved to a position that is designated in advance, and operates the announcement unit based on a result of the determination.

7. A non-transitory computer-readable recording medium storing a light emission control program of a portable device having a light emission unit to emit light on a case, the program being executed by a computer, the recording medium comprising:
clocking time;
acquiring position information indicating a position necessary for illuminating the light emission unit;
reading map information from a storing unit;
referring to the acquired position information and the map information read from the storing unit;
determining whether the portable device is on a road or not from a position on a map; and
determining whether to illuminate the light emission unit by using acquired timekeeping information and the acquired position information, and controlling the light emission unit under either a light emission state or an extinction state from a result of the determination,
wherein a result of determining whether the portable device is on a road or not is used for light emission control of the light emission unit.

8. The recording medium of claim 7, further comprising:
making a walking detection unit output walking information indicating whether a carrier of the portable device is walking or not, to acquire information indicating a state necessary for illuminating the light emission unit; and
determining whether to illuminate the light emission unit by using acquired timekeeping information and the acquired information indicating a state, and controlling the light emission unit under either the light emission state or the extinction state from a result of the determination.

9. The recording medium of claim 7, further comprising:
making a positioning unit detect a position of the portable device.

10. The recording medium of claim 7, further comprising:
determining whether the portable device has moved to a position that is designated in advance, or not; and
instructing an announcement unit to operate based on a result of the determination.

11. A light emission control method of a portable device having a light emission unit to emit light on a case, the method comprising:
clocking time;
acquiring position information indicating a position necessary for illuminating the light emission unit;
reading map information from a storing unit;
referring to the acquired position information and the map information read from the storing unit;
determining whether the portable device is on a road or not from a position on a map; and
determining whether to illuminate the light emission unit by using acquired timekeeping information and the acquired position information, and controlling the light emission unit under either a light emission state or an extinction state from a result of the determination,
wherein a result of determining whether the portable device is on a road or not is used for light emission control of the light emission unit.

12. The light emission control method of claim 11, further comprising:
outputting walking information indicating whether a carrier of the portable device is walking or not, to acquire information indicating a state necessary for illuminating the light emission unit; and
determining whether to illuminate the light emission unit by using acquired timekeeping information and the acquired information indicating a state, and controlling the light emission unit under either the light emission state or the extinction state from a result of the determination.

13. The light emission control method of claim 11, further comprising:
detecting a position of the portable device.

14. The light emission control method of claim 11, further comprising:
acquiring timekeeping information from an outside of the portable device.

15. The light emission control method of claim 11, further comprising:
displaying a position of the portable device with the map information on a display.

16. The light emission control method of claim 11, further comprising:
referring to the timekeeping information and the position information; and
controlling a light emission state of the light emission unit.

17. The light emission control method of claim 11, further comprising:
determining whether the portable device has moved to a position that is designated in advance, or not; and
announcing the position based on a result of the determination by an announcement unit.

* * * * *